(12) United States Patent
Dong

(10) Patent No.: US 12,028,249 B2
(45) Date of Patent: Jul. 2, 2024

(54) RESOURCE AWARE FORWARDING IN THE NETWORK WITH ABSTRACT DESTINATION ADDRESS AND SEMANTIC ADDRESSING

(71) Applicant: Huawei Technologies Co., Ltd., Shenzhen (CN)

(72) Inventor: Lijun Dong, Addison, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/452,219

(22) Filed: Aug. 18, 2023

(65) Prior Publication Data
US 2023/0396544 A1    Dec. 7, 2023

Related U.S. Application Data

(63) Continuation of application No. PCT/US2021/043394, filed on Jul. 28, 2021.

(60) Provisional application No. 63/150,855, filed on Feb. 18, 2021.

(51) Int. Cl.
*H04L 45/74* (2022.01)
*H04L 45/00* (2022.01)
*H04L 47/70* (2022.01)

(52) U.S. Cl.
CPC ........... *H04L 45/74* (2013.01); *H04L 45/566* (2013.01); *H04L 47/822* (2013.01)

(58) Field of Classification Search
CPC ...... H04L 45/566; H04L 45/74; H04L 47/822
See application file for complete search history.

(56) References Cited

U.S. PATENT DOCUMENTS

| | | | | |
|---|---|---|---|---|
| 10,158,568 B2 * | 12/2018 | Gage | ........... | H04L 61/2521 |
| 11,178,043 B1 * | 11/2021 | Lewis | ........... | H04L 45/04 |
| 11,606,301 B2 * | 3/2023 | Sharma | ........... | H04L 45/74 |
| 2011/0271007 A1 * | 11/2011 | Wang | ........... | H04L 45/50 |
| | | | | 713/160 |
| 2022/0174004 A1 * | 6/2022 | Filsfils | ........... | H04L 45/306 |

OTHER PUBLICATIONS

Chen, Z., et al., "New IP Framework and Protocol for Future Applications," NOMS 2020—2020 IEEE/IFIP Network Operations and Management Symposium, IEEE, Apr. 20, 2020, 4 pages.

Li, R., et al., "New IP: A Data Packet Framework to Evolve the Internet," 2020 IEEE 21st International Conference on High Performance Switching and Routing (HPSR), IEEE, May 11, 2020, 9 pages.

(Continued)

*Primary Examiner* — George C Neurauter, Jr.
(74) *Attorney, Agent, or Firm* — Conley Rose, P.C.

(57) ABSTRACT

A method performed by a network node for routing data packets is disclosed. The method includes receiving a data packet that includes an abstract destination address in a shipping specification of the data packet. The abstract destination address indicates one or more network resource requirements of a destination. The method also includes determining whether a server satisfies the one or more network resource requirements of the destination specified by the abstract destination address. The method also includes forwarding the data packet to the server according to the determination.

20 Claims, 6 Drawing Sheets

(56) References Cited

OTHER PUBLICATIONS

Fink, et al., "Enhancing Security and Privacy with In-Network Computing," draft-fink-coin-sec-priv-01.
Satyanarayanan, et al., "The case for VM-based cloudlets in mobile computing," IEEE Pervasive Comput., vol. 8, No. 4, pp. 14-23, Oct./Dec. 2009.
Bonomi, et al., "Fog Computing and Its Role in the Internet of Things," Poc. ACM 1st Edition MCC Workshop Mobile Cloud Comput., Helsinki, Finland, 2012, pp. 13-16.
"Mobile Edge Computing (MEC) Terminology," European Telecommunications Standard Institute, ETSI GS MEC 001 V1.1.1., Mar. 2016, 7 pages.
Fu, et al., "Requirements of Computing and Network Joint Optimization and Scheduling," draft-fu-coinrg-joint-optimization-req-00, Nov. 2, 2020, 7 pages.
"Focus Group on Technologies for Network 2030—FG-Net2030-Gap Network Analysis of Network 2030 New Services, Capabilities, and Use Cases," ITU-T Technical Report, https://www.itu.nt/pug-T-FG-NET2030-2020-1, 2020, 40 pages.
"Focus Group on Technologies for Network 2030 (FG NET-2030)—FG NET-2030 Sub-G2 New Services and Capabilities for Network 2030: Description, Technical Gap and Performance Target Analysis," ITU-T, Oct. 2019, 45 pages.
Dey, "Understanding and Using Context," Personal Ubiquitous Computing, vol. 5, 2001, pp. 4-7.
Li, et al., "A New Framework and Protocol for Future Networking Applications," ACM Sigcomm Workshop on Networking for Future Networking Applications and Technologies (NEAT-2018), May 2018, pp. 637-648.
Li, et al., "A Framework for Qualitative Communications Using Big Packet Protocol," ACM Sigcomm NEAT Workshop 2019, arXiv:1906.10766v1 [cs.NI] Jun. 25, 2019, 7 pages.

* cited by examiner

| 402 | 404 | 406 |
|---|---|---|
| SERVER IP ADDRESS | RESOURCES | TOPOLOGICAL AND NETWORKING CONTEXT |
| 10.2.200.12 | COMPUTE (POWER AMOUNT, EXPIRATION TIME), ODA | DIS, BW, CD, L |
| 10.4.100.16 | COMPUTE (POWER AMOUNT, EXPIRATION TIME) | DIS, BW, CD, L |
| 12.4.60.90 | COMPUTE (POWER AMOUNT, EXPIRATION TIME), ODA | DIS, BW, CD, L |

FIG. 4

| SOURCE: CAR | DESTINATION: CP.ODA-DIS |
|---|---|

| SOURCE: CAR | DESTINATION: 12.4.60.90 |
|---|---|

RESOURCE AWARE FORWARDING IN THE NETWORK WITH ABSTRACT DESTINATION ADDRESS AND SEMANTIC ADDRESSING

CROSS-REFERENCE TO RELATED APPLICATIONS

This application is a continuation of International Patent Application No. PCT/US2021/043394 filed on Jul. 28, 2021, by Futurewei Technologies, Inc., and titled "Resource Aware Forwarding in the Network with Abstract Destination Address and Semantic Addressing," which claims the benefit of U.S. provisional patent application No. 63/150,855, filed Feb. 18, 2021, by Futurewei Technologies, Inc., and titled "IP Enabled Collaborative Computation in The Network for Driver Assistance," which is incorporated by reference.

TECHNICAL FIELD

The present disclosure is generally related to network communications, and specifically to resource aware forwarding in a network with abstract destination address and semantic addressing.

BACKGROUND

The Internet Protocol (IP) is a fundamental building block of current data plane technologies in networks. While the IP is well suited for traditional terminals and web-based applications, the IP has several deficiencies when addressing the evolving needs of modern digital society such as International Telecommunication Union-Telecommunication (ITU-T) Focus Group Technologies for Network 2030 (FG NET-2030), emerging industry verticals, and applications in 5G and Beyond 5G (B5G).

SUMMARY

A first aspect relates to a method performed by a network node for routing data packets. The method includes receiving a data packet that includes an abstract destination address in a shipping specification of the data packet, the abstract destination address indicating one or more network resource requirements of a destination. The method also includes determining whether a server satisfies the one or more network resource requirements of the destination specified by the abstract destination address. The method also includes forwarding the data packet to the server according to the determination.

Optionally, in a first implementation according to the first aspect, the abstract destination address includes a first portion and a second portion, the first portion indicating the one or more network resource requirements of a destination, and the second portion indicating a physical criteria of the destination Optionally, in a second implementation according to the first aspect or any preceding implementation thereof, determining whether the server satisfies the one or more network resource requirements of the destination specified by the abstract destination address includes the steps of identifying one or more servers that satisfy the one or more network resource requirements of the destination specified in the first portion of the abstract destination address; when there is only one identified server that satisfies the one or more network resource requirements of the destination specified in the first portion of the abstract destination address, selecting the one identified server that satisfies the one or more network resource requirements of the destination specified in the first portion of the abstract destination address as the server; and when there are multiple identified servers that satisfy the one or more network resource requirements of the destination specified in the first portion of the abstract destination address, selecting the server from the multiple identified servers according to the physical criteria of the destination specified in the second portion of the abstract destination address.

Optionally, in a third implementation according to the first aspect or any preceding implementation thereof, when there are no servers that satisfy the one or more network resource requirements of the destination specified in the abstract destination address, the server is set to a default destination address.

Optionally, in a fourth implementation according to the first aspect or any preceding implementation thereof, the method further includes modifying the abstract destination address in the shipping specification of the data packet to an Internet protocol (IP) address corresponding to the server.

Optionally, in a fifth implementation according to the first aspect or any preceding implementation thereof, the default destination address is specified in a third portion of the abstract destination address.

Optionally, in a sixth implementation according to the first aspect or any preceding implementation thereof, the default destination address is a central cloud server associated with a source of the data packet.

Optionally, in a seventh implementation according to the first aspect or any preceding implementation thereof, the one or more network resource requirements of the destination specified in the abstract destination address includes a computation capability of the destination.

Optionally, in an eighth implementation according to the first aspect or any preceding implementation thereof, the one or more network resource requirements of the destination specified in the abstract destination address includes a specific algorithm availability at the destination.

Optionally, in a ninth implementation according to the first aspect or any preceding implementation thereof, the physical criteria of the destination specified in the second portion of the abstract destination address include a distance away from the network node.

Optionally, in a tenth implementation according to the first aspect or any preceding implementation thereof, the physical criteria of the destination specified in the second portion of the abstract destination address include a link bandwidth requirement.

Optionally, in an eleventh implementation according to the first aspect or any preceding implementation thereof, the physical criteria of the destination specified in the second portion of the abstract destination address include a degree of congestion requirement.

Optionally, in a twelfth implementation according to the first aspect or any preceding implementation thereof, the physical criteria of the destination specified in the second portion of the abstract destination address include an end-to-end latency requirement.

Optionally, in a thirteenth implementation according to the first aspect or any preceding implementation thereof, the method further includes the steps of: maintaining a resource record of the servers, the resource record comprising a server address and resource properties for each of the servers; and identifying the servers that satisfy the one or more network resource requirements of the destination specified in the abstract destination address based on the resource record of the servers.

Optionally, in a fourteenth implementation according to the first aspect or any preceding implementation thereof, the resource record further includes network topology context data for each of the servers.

Optionally, in a fifteenth implementation according to the first aspect or any preceding implementation thereof, the method further includes the steps of: receiving the resource properties of the servers from the servers, and modifying the resource records of the servers according to the resource properties of the servers.

Optionally, in a sixteenth implementation according to the first aspect or any preceding implementation thereof, the resource properties of the servers from the servers are included in data packets periodically broadcasted by the servers to indicate the resource properties of the servers.

Optionally, in a seventeenth implementation according to the first aspect or any preceding implementation thereof, the resource properties of the server are included in router advertisement data packets.

Optionally, in an eighteenth implementation according to the first aspect or any preceding implementation thereof, the method further includes the steps of: maintaining a plurality of routing tables, each routing table comprising a server address name, wherein the server address name is a semantic address indicating resource properties of the server, and performing an intersection matching using the plurality of routing tables in identifying the servers that satisfy the one or more network resource requirements of the destination specified in the abstract destination address.

Optionally, in a nineteenth implementation according to the first aspect or any preceding implementation thereof, the semantic address includes a first semantic address portion, a second semantic address portion, and a third semantic address portion, the first semantic address portion indicating available resource types of the server, the second semantic address portion indicating supported application types of the server, and the third semantic address portion indicating a unique identifier associated with the server.

Optionally, in a twentieth implementation according to the first aspect or any preceding implementation thereof, the method further includes applying a hash function to the semantic address to reduce an address length.

Optionally, in a twenty-first implementation according to the first aspect or any preceding implementation thereof, the method further includes applying a first hash function to the first semantic address portion of the semantic address, and applying a second hash function to the second semantic address portion of the semantic address.

Optionally, in a twenty-second implementation according to the first aspect or any preceding implementation thereof, the method further includes the steps of: receiving the resource properties of the servers from the servers, and modifying the plurality of routing tables according to the resource properties of the servers.

Optionally, in a twenty-third implementation according to the first aspect or any preceding implementation thereof, the resource properties of the servers from the servers are included in data packets periodically broadcasted by the servers to indicate the resource properties of the servers.

Optionally, in a twenty-fourth implementation according to the first aspect or any preceding implementation thereof, the resource properties of the server are included in router advertisement data packets.

Optionally, in a twenty-fifth implementation according to the first aspect or any preceding implementation thereof, the method further includes reducing a routing table by aggregating intersected server address names that have a common next hop forwarding interface.

A second aspect relates to a method performed by a network node for routing data packets. The method includes generating a data packet comprising an abstract destination address in a shipping specification of the data packet. The abstract destination address includes a first portion and a second portion, the first portion indicating one or more network resource requirements of a destination, and the second portion indicating a physical criteria of the destination. The method also includes transmitting the data packet to a network node of configured to forward the packet based at least in part on the one or more network resource requirements of the destination specified in the first portion of the abstract destination address.

Optionally, in a first implementation according to the second aspect, the abstract destination address further includes a default destination address specified in a third portion of the abstract destination address.

Optionally, in a second implementation according to the second aspect or any preceding implementation thereof, the default destination address is a central cloud server associated with a source of the data packet.

Optionally, in a third implementation according to the second aspect or any preceding implementation thereof, the one or more network resource requirements of the destination specified in the abstract destination address include a computation capability of the destination.

Optionally, in a fourth implementation according to the second aspect or any preceding implementation thereof, the one or more network resource requirements of the destination specified in the abstract destination address include a specific algorithm availability at the destination.

Optionally, in a fifth implementation according to the second aspect or any preceding implementation thereof, the physical criteria of the destination specified in the second portion of the abstract destination address include a distance away from the network node.

Optionally, in a sixth implementation according to the second aspect or any preceding implementation thereof, the physical criteria of the destination specified in the second portion of the abstract destination address include a link bandwidth requirement.

Optionally, in a seventh implementation according to the second aspect or any preceding implementation thereof, the physical criteria of the destination specified in the second portion of the abstract destination address include a degree of congestion requirement.

Optionally, in an eighth implementation according to the second aspect or any preceding implementation thereof, the physical criteria of the destination specified in the second portion of the abstract destination address include an end-to-end latency requirement.

A third aspect relates to a method performed by a network node for routing data packets. The method includes maintaining a plurality of routing tables, each routing table includes a server address name and a metric for a plurality of servers. The server address name is a semantic address indicating resource properties of a server. The method also includes receiving a data packet that includes an abstract destination address in a shipping specification of the data packet. The abstract destination address includes a first portion and a second portion. The first portion indicating one or more network resource requirements of a destination. The second portion indicating a physical criteria of the destination. The method also includes performing an intersection matching between the one or more network resource requirements of the destination specified in the first portion of the abstract destination address and the semantic address of each of the plurality of servers in the plurality of routing tables to identify a selected server that satisfies the one or more network resource requirements of the destination specified in the first portion of the abstract destination address. The method also includes forwarding the data packet to the selected server.

Optionally, in a first implementation according to the third aspect, the semantic address includes a first portion and a second portion, the first portion indicating available resource types of the server, and the second portion indicating supported application types of the server.

Optionally, in a second implementation according to the third aspect or any preceding implementation thereof, the method also includes applying a hash function to the semantic address to reduce an address length of the semantic address stored in the plurality of routing tables.

Optionally, in a third implementation according to the third aspect or any preceding implementation thereof, the method also includes applying a first hash function to the first portion of the semantic address, and applying a second hash function to the second portion of the semantic address.

Optionally, in a fourth implementation according to the third aspect or any preceding implementation thereof, the method also includes receiving the resource properties of the servers from the servers, and modifying the plurality of routing tables according to the resource properties of the servers.

Optionally, in a fifth implementation according to the third aspect or any preceding implementation thereof, the method also includes receiving the resource properties of the servers in data packets that are periodically broadcasted by the servers to indicate the resource properties of the servers.

Optionally, in a sixth implementation according to the third aspect or any preceding implementation thereof, the method also includes receiving the resource properties of the servers in router advertisement data packets.

Optionally, in a seventh implementation according to the third aspect or any preceding implementation thereof, the method also includes reducing a routing table by aggregating intersected server address names that have a common next hop forwarding interface.

A fourth aspect relates to a network node for routing data packets. The network node includes a memory storing instructions and a processor coupled to the memory. The processor is configured to execute the instructions to cause the network node to perform the steps in any of the preceding aspects or any preceding implementation thereof.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The disclosed embodiments provide resource aware forwarding in a network with abstract destination address and semantic addressing. The disclosed embodiments resolve or alleviate the issue of requiring a source to know the address of a server or edge server capable of handling a particular request when generating the packet. The disclosed embodiments provide technical improvements to the communication network and network elements by alleviating network traffic congestion and improving the efficiency in routing data packets.

Figure 1:
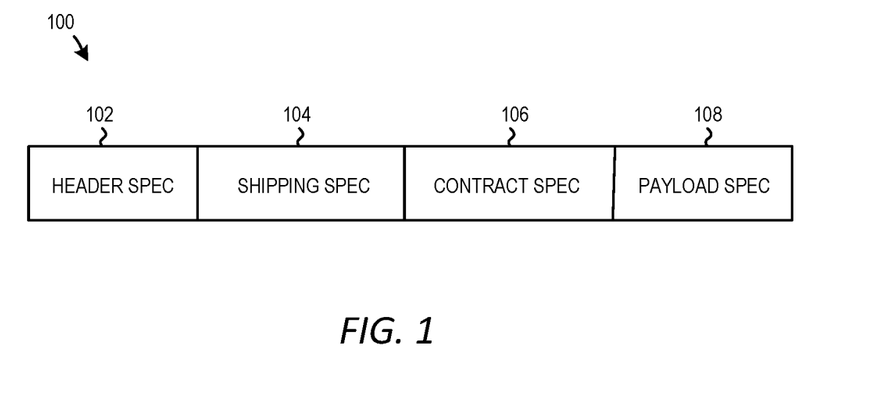
FIG. 1 is a schematic diagram illustrating a New IP packet.

FIG. 1 is a schematic diagram illustrating a New IP packet 100. New IP is a data plane technology that defines a new network datagram format, its specification (spec), and corresponding capabilities in the network nodes. The New IP packet 100 includes a header spec 102, a shipping spec 104, a contract spec 106, and a payload spec 108. It will be understood that the present disclosure can also be applicable to other types of packets that are not New IP packets, and the use of a New IP packet is just an example.

The header spec 102 is the start of the New IP packet 100. The header spec 102 describes the offsets (i.e., indicate the beginning and possibly length) of the shipping spec 104, the contract spec 106, and the payload spec 108. The shipping spec 104 supports a flexible address format scheme, is backward compatible (i.e., existing addressing schemes, e.g., legacy IP, Multiprotocol Label Switching (MPLS) or other well-known packet type support only by use of address type field), and supports hybrid addressing formats. The flexible address format scheme allows different types of address namespaces to be embedded. For example, the New IP packet 100 can carry SigFox™, LoRA™, legacy addresses, and even new semantic formats like service identifiers, location identifiers, and variable-length identifiers. Hybrid addressing formats permit asymmetric addresses. For instance, the source and destination addresses can be of different formats (e.g., the source is Internet protocol version 4 (IPv4) and the destination is MPLS).

The contract spec 106 enables a variety of contract services. A contract describes a formal service specification of a service, which includes clauses to describe the type of network service capability, actions, and accounting information. A contract can be understood as a service-specific arrangement between two or more parties. The parties may include an application and network, or inter-network ISPs, application, and end-user. Contracts can also provide instructions for monitoring. In comparison to traditional Quality of Service (QoS), contracts operate at much lower level—per packet, and instruct in high-level abstract commands.

The payload spec 108 associates network semantics to the user data while maintaining the payload integrity. The payload spec 108 does not dictate that the packet received by a remote end-user is unusable when the received payload does not match bit-by-bit with the transmitted payload from the sender. Instead, the payload spec 108 provides options to the receiver to consume partial information in the payload. This partial-packet reception helps to mitigate re-transmission overheads and delays when faced with slow or congested conditions.

Figure 2:
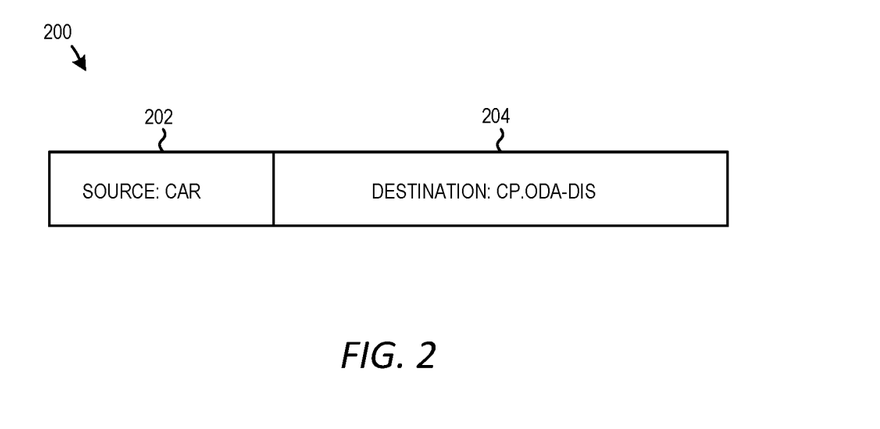
FIG. 2 is a schematic diagram illustrating a shipping specification (spec) in accordance with an embodiment of the present disclosure.

FIG. 2 is a schematic diagram illustrating a shipping spec 200 in accordance with an embodiment of the present disclosure. The shipping spec 200 is an example of the shipping spec 104 that can be included in the New IP packet 100 in FIG. 1. The shipping spec 200 includes a source address 202 and a destination address 204. The shipping spec 200 enables an abstract address as well as existing address schemes (e.g., Internet protocol version 4 (IPv4) and Internet protocol version 6 (IPv6)) to be used as the source address 202 and/or the destination address 204. An abstract address is a flexible address as opposed to a physical or fixed address such as an IP address. For example, an abstract address allows for different types and formats of addresses of network nodes based on the functionality and network connecting the network nodes. As referred to herein, an abstract destination address is an abstract address used to specify a destination. An abstract source address is an abstract address used to specify a source. In accordance with an embodiment, an abstract destination address includes a first portion that can be used by a source node to specify the requested resources of a destination server. Non-limiting examples of resources can include, but are not limited to, a server's computation capability or computation power (CP), availability, and particular algorithms (e.g., object detection algorithm (ODA)). In an embodiment, by specifying the resources of a destination as part of an abstract destination address, the resources of servers or edge servers in the network can be leveraged. For example, instead of simply relying on a remote central cloud to route packets (e.g., packets that request a particular service) from a source to a destination when the destination address is not known to the source, an abstract destination address can include requested resources information that can be used by other network devices to route the packets to a destination suitable for handling the packet. Thus, the disclosed embodiments reduce overall network congestion/traffic and reduce latency (i.e., the delay between the time the source sends the packet and the time the source receives data back from the destination based on the requested service).

In an embodiment, the abstract destination address can also include a second portion specifying a physical criteria of the destination such as topology and routing strategy. In an embodiment, the second portion of the abstract destination address is considered when there are more than one destination servers that satisfy the requested resources specified in first portion of the abstract destination address. For example, as shown in FIG. 2, the shipping spec 200 specifies "CP.ODA-DIS" as an abstract destination address of the New IP packet. CP.ODA is the first portion specifying the requested resources of a destination server. For instance, CP.ODA indicates that the destination server should have a particular level of computation power and should support the object detection algorithm or application. DIS is the second portion specifying a physical criterion of the destination. In this example, DIS specifies the distance away from the current router or network node. For example, the DIS criterion may specify that the destination node or server be within a predetermined number of hops (e.g., 3 hops) away from the current router. In an embodiment, when the second portion of the abstract destination address is not specified (i.e., missing) in the abstract destination address of the New IP packet, the nearest server in the network is the default criteria.

In one example, the source of the request carrying the shipping spec 200 can be a car (thus, "SOURCE: CAR" in FIG. 2), such as a fully or semi-autonomous vehicle. In this context, the request can be for assistance in detecting objects on or near a road (thus, requesting the object detection algorithm). Further, a low latency response may be desired, to provide enough time to avoid a potential collision (thus, requesting that the request be processed by a server or network device chosen according to distance from the current router or the source).

Figure 3:
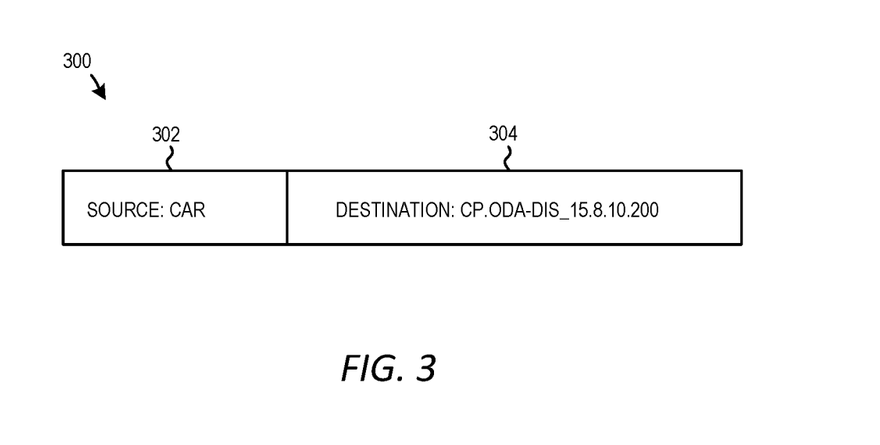
FIG. 3 is a schematic diagram illustrating a shipping spec in accordance with an embodiment of the present disclosure.

FIG. 3 is a schematic diagram illustrating a shipping spec 300 in accordance with an embodiment of the present disclosure. The shipping spec 300 is an example of the shipping spec 104 that can be included in the New IP packet 100 in FIG. 1. The shipping spec 300 includes a source address 302 and a destination address 304. The source address 302 is used to specify a physical address or abstract address of a source of the data packet. The destination address 304 is used to specify a physical address or abstract address of a destination for the data packet. In an embodiment, the abstract destination address can include a first portion and a second portion similar to the shipping spec 200 in FIG. 2, with the first portion indicating the requested resources of a destination server, and the second portion specifying a physical criteria of the destination such as topology and routing strategy to be considered when multiple servers match the requested resources specified in the first portion. In an embodiment, the abstract destination address includes a third portion that specifies a default server address (e.g., 15.8.10.200). In an embodiment, the packet is forwarded to the default server address when there are no servers (e.g., in a distributed edge cloud) matching the requested resources specified in the first portion of the abstract destination address.

Figure 4:
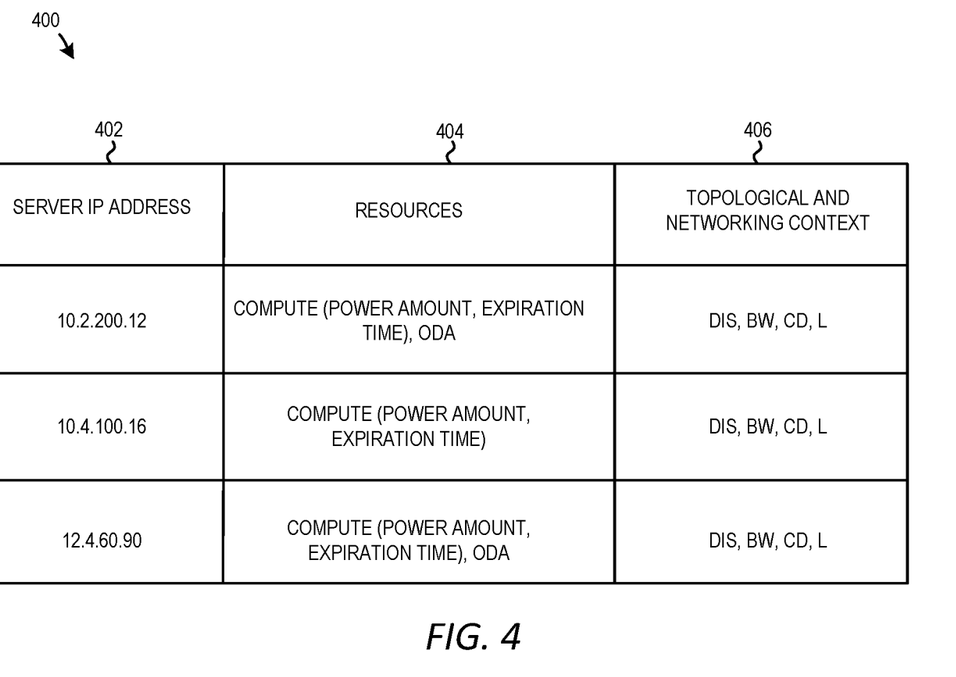
FIG. 4 is a schematic diagram illustrating a resource record in accordance with an embodiment of the present disclosure.

FIG. 4 is a schematic diagram illustrating a resource record 400 in accordance with an embodiment of the present disclosure. The resource record 400 is maintained by routers in the network. In an embodiment, the resource record 400 contains information about the servers and/or edge servers that enables resource aware forwarding when a New IP packet containing an abstract destination address is received by the router. For example, the resource record 400 can contain a Server IP Address field 402, a Resources field 404, and Topological and Networking Context field 406. The Server IP Address field 402 contains the Server IP Address. The Resources field 404 contains the resources of the edge server such as, but not limited to, computation capability, algorithm availability information, and the expiration time on each edge server. The Topological and Networking Context field 406 contains topological and networking context information such as, but not limited to, distance away from the current router (DIS), bandwidth (BW), congestion degree (CD), and end-to-end latency (L). In an embodiment, the resource record 400 is indexed by the Server IP Address. The information in the resource record 400 can also be stored on network devices in other formats. Thus, more generally, the router can store server IP addresses and their corresponding resources and topological and network contexts.

In an embodiment, the resource information used to generate the resource record 400 is piggybacked on other packets that are normally forwarded in the network. For example, the resource information can be added to Link-State Advertisements (LSAs) transmitted by a router to communicate the router's local routing topology to all other local routers in the same Open Shortest Path First (OSPF) area. As another example, the resource information can be added to a Link State Packet (LSP) generated by a network router in a link state routing protocol that lists the router's neighbors.

Alternatively, in an embodiment, a router periodically broadcasts a resource data packet containing the resource information of a server or an edge server attached to the router to the router's neighbors. In an embodiment, the router may specify the broadcasting diameter of the resource data packet (i.e., the number of hops that the resource data packet would be forwarded).

Figure 5:
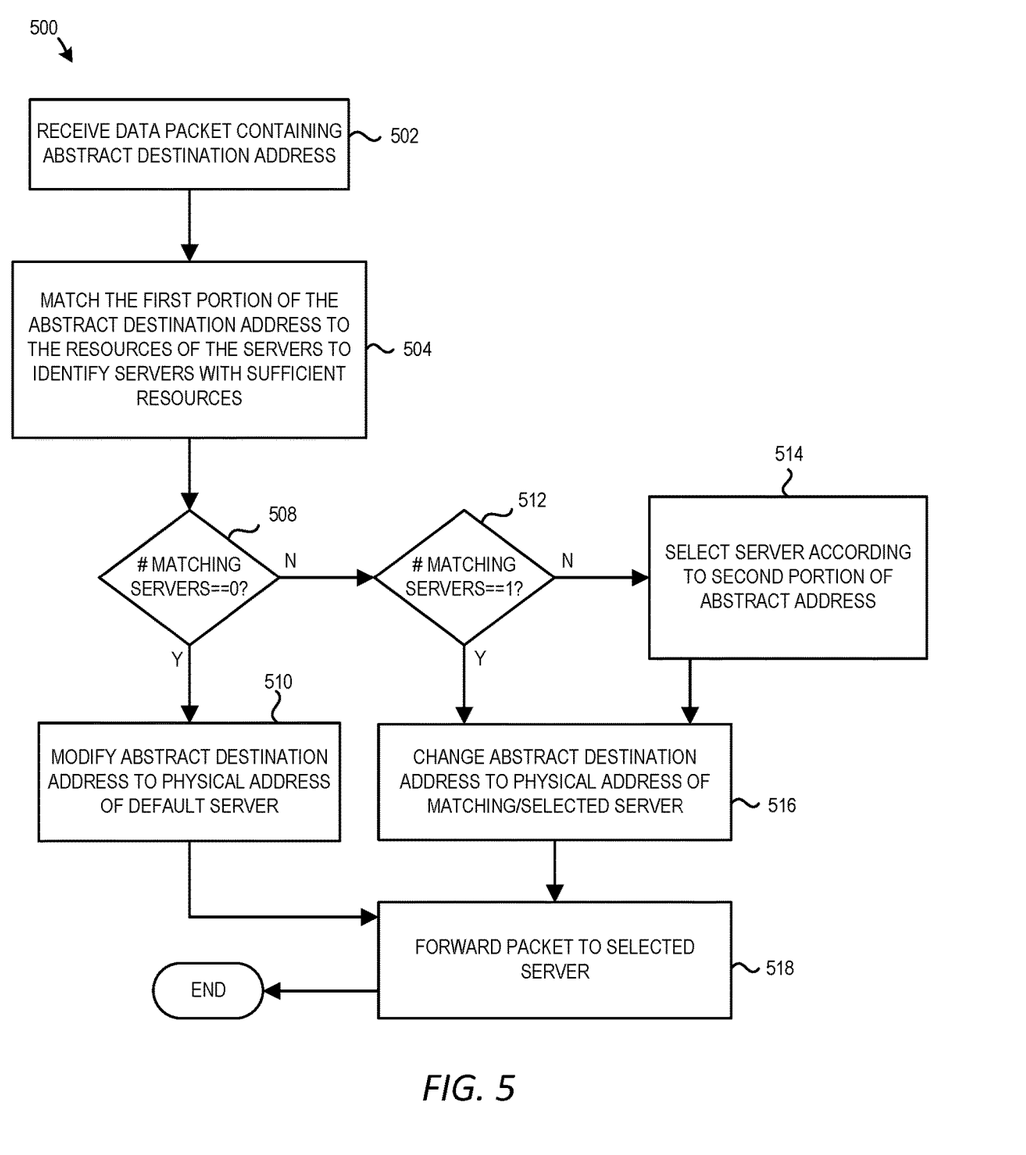
FIG. 5 is a flowchart illustrating a process for routing a data packet containing an abstract destination address in accordance with an embodiment of the present disclosure.

FIG. 5 is a flowchart illustrating a process 500 for routing a data packet containing an abstract destination address in accordance with an embodiment of the present disclosure. The process 500 is performed by a router in the network. The process 500 begins, at step 502, with the router receiving a data packet containing an abstract destination address. For example, the data packet may be a new IP data packet 100 as described in FIG. 1 and include a shipping spec (such as the shipping spec 200, 300) containing an abstract destination address (for example, as described in FIG. 2 and FIG. 3). In an embodiment, the abstract destination address includes a first portion and a second portion. The first portion indicates one or more network resource requirements of a destination. The second portion indicates a physical criteria of the destination.

Figure 6:
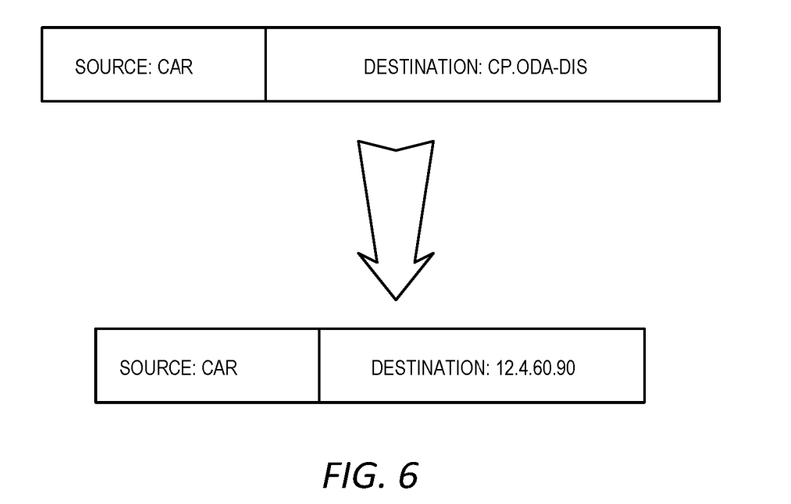
FIG. 6 is a schematic diagram illustrating a process for modifying an abstract destination address to a physical address of a selected server in accordance with an embodiment of the present disclosure.

At step 504, the router identifies servers with sufficient resources by matching the first portion of the abstract destination address to the resources of the servers. In an embodiment, the router identifies these servers using a resource record of the servers such as the resource record 400 in FIG. 4. At step 508, the router determines whether there are any matching servers. When there are no matching servers (i.e., #Matching servers==0), a default server is selected and the router, at step 510, modifies the abstract destination address to a physical address of the default server as shown in FIG. 6. The physical address of the default server may be specified in a third portion of the abstract destination address as illustrated in FIG. 3. In an embodiment, when there is no default server address provided in the abstract destination address (i.e., no third portion), the packet is forwarded to a default server (e.g., a central cloud server) for the source when there are no servers matching the requested resources specified in the first portion of the abstract destination address. Alternatively, in an embodiment, when the third portion indicates a default server address destination that has insufficient available resources to run the request associated with the data packet based on the resource record of the router, the router ignores the default server address destination specified in the third portion of the abstract destination address and forwards the packet to a default server for the source.

At step 512, when there is only one server matching the requested resources specified in the first portion of the abstract destination address (i.e., #Matching servers==1), the only matching server is selected and the router, at step 516, modifies the abstract destination address to a physical address of the only matching server. However, when there are multiple servers matching the requested resources specified in the first portion of the abstract destination address, the router, at step 514, selects one of the matching servers according to the second portion of the abstract destination address. As stated above, the second portion specifies a network or topology context or metric such as, but not limited to, distance away from the current router (DIS), bandwidth (BW), congestion degree (CD), and end-to-end latency (L). For example, when the second portion of the abstract destination address is DIS, then the router selects the matching server closest to the router (i.e., shortest path). If there is no specified network or topology context or metric, the server can be selected according to default rules such as those further discussed herein. At step 516, the router modifies the abstract destination address to a physical address of the matching server that was selected.

At step 518, the router forwards the data packet to the selected server according to the modified destination address, with the process 500 terminating thereafter.

FIG. 6 is a schematic diagram illustrating a process for modifying an abstract destination address to a physical address of a selected server in accordance with an embodiment of the present disclosure. As shown in FIG. 6, an abstract destination address (e.g., CP.ODA-DIS) specified in a shipping spec of a new IP packet is modified to a physical address (e.g., 12.4.60.90) of a selected server. As described in FIG. 5, the selected server may be the only server matching the requested resources specified in first portion of the abstract destination address. The selected server may also be one of a number of matching servers selected according to a second portion of the abstract destination address. Alternatively, the selected server may be a default server specified in a third portion of the abstract destination address or may be a default server associated with the source when there is no server matching the requested resources specified in the first portion of the abstract destination address.

Figure 7:
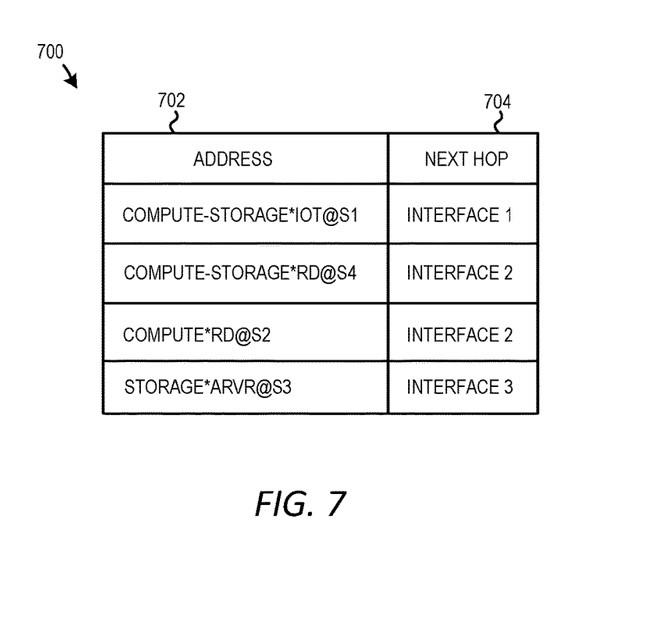
FIG. 7 is a schematic diagram illustrating a resource record according to an embodiment of the present disclosure.

FIG. 7 is a schematic diagram illustrating a resource record 700 according to an embodiment of the present disclosure. The resource record 700 is another example of how a router can maintain the resources of edge servers in the network. The resource record 700 includes an address field 702 and a next hop field 704. In contrast to the resource record 400 in FIG. 4, the resource record 700 does not store the physical addresses (i.e., IP addresses) of the edge servers. Instead, the resource record 700 uses the resources and capabilities of a server as a semantic address in the address field 702. As described above, the resources and capabilities of the edge servers can be advertised by the edge servers periodically in resource data packets or can be added to or piggybacked on existing packets currently advertised by the edge servers (e.g., LSP or LSA packets). For example, in FIG. 7, the resources and capabilities of the server 1 (S1) meet a certain level of computational resources (Compute), provide a certain level of storage resources (Storage), and support Internet of Things (IoT) applications. The router stores the semantic address of server 1 as Compute-Storage*IoT@S1 in the address field 702. The router stores the output interface (e.g., interface 1) to server 1 in the next hop field 704. Similarly, the router stores the resources and capabilities of the server 2 (computational resources and supports remote driving (RD) applications), server 3 (storage resources and supports augmented reality/virtual reality (ARVR) applications), and server 4 (computational resources, storage resources, and supports RD applications) as a semantic addresses in the address field 702. The corresponding output interface to server 2 (S2), server 3 (S3), and server 4 (S4) are stored in the next hop field 704. Thus, the semantic address of a server indicates the resources and capabilities of the server. Therefore, when a router receives a new IP packet with an abstract destination address specifying the required resources of a destination server to process the packet, the router can perform intersection matching of the requested resources to the semantic addresses in the address field 702 of the resource record 700 to determine the next hop to forward the packet. The semantic address of a network node (e.g., a server) may include more resources than that requested in a packet. Performing an intersection match determines whether the semantic address of a network node includes the requested resources (i.e., the intersection indicates where the requested resources in the packet and the resources specified in the semantic address match). For example, if the requested resource in a packet is COMPUTE*IOT, performing an intersection match with the semantic addresses in the address field 702, identifies the semantic address COMPUTE-STORAGE*IOT@S1 as capable of satisfying the requested resources in the packet because the semantic address COMPUTE-STORAGE*IOT@S1 includes COMPUTE*IOT as requested in the packet. In an embodiment, the destination server is not required to be located at the next hop indicated in the resource record 700. For instance, in an embodiment, the resource record 700 simply informs the network node which interface to forward the packet towards the destination server (i.e., which path to take to get to the destination).

When a match is found, the router forwards the packet according to the corresponding interface specified in the next hop field 704. A server's semantic address might change over time according to its resource availability. For example, when server 1 is no longer able to admit more computation tasks, then the router will update the semantic address of server 1 in the resource record 700 by removing the Compute resource from the semantic address of server 1 (e.g., to Storage*IoT@S1).

In an embodiment, a hash function is applied to the semantic address to reduce the address length. A hash function is any function that can be used to map data of arbitrary size to fixed-size values. The values returned by a hash function are called hash values. The hash values are then stored as the semantic address in the address field 702. In an embodiment, a different hash function is used to hash each component in the semantic address to a short string or number. For instance, a first hash function is applied to the first portion of the semantic address (e.g., the resources portion), and a second hash function is applied to the second portion of the semantic address (e.g., the supported applications portion). For example, the semantic address for server 1 could be hashed into a string such as 1-2*200 @S1. When a packet is received, the router can apply the same hash function to the requested resources specified in the packet to generate a string for matching the semantic name of the servers in the resource record 700.

Figure 8:
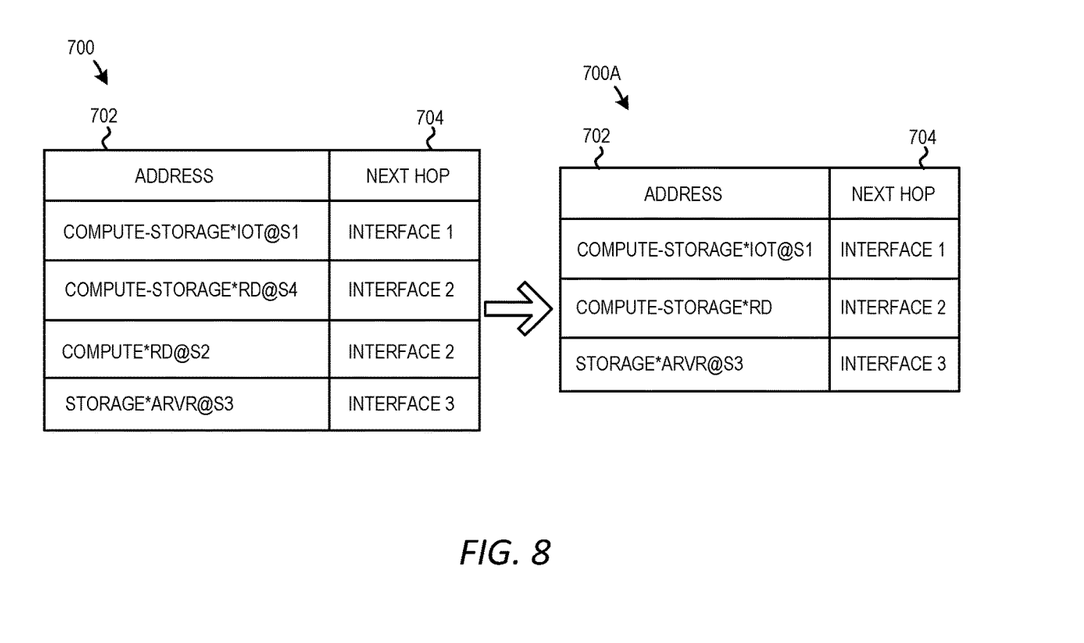
FIG. 8 is a schematic diagram illustrating an aggregated resource record in accordance with an embodiment of the present disclosure.

In an embodiment, the semantic addresses in the resource record 700 can be aggregated to reduce the size of the resource record 700. For example, FIG. 8 is a schematic diagram illustrating a resource record 700A in accordance with an embodiment of the present disclosure. In an embodiment, aggregation of the semantic address is possible when a subset of resources shares the same next hop as a superset of resources. For example, in the resource record 700, the resources for server 2 (Compute*RD) is a subset of the resources for server 4 (Compute-Storage*RD) and both server 2 and server 3 shares the same next hop (interface 2). Thus, the semantic names for server 2 and server 3 can be combined as Compute-Storage*RD. Interface 2 is kept as the same next hop for the combined semantic name. Thus, when a router receives a packet that requests Compute*RD or Compute-Storage*RD, either request can be satisfied by forwarding the packet to the next hop using interface 2. In an embodiment, for each metric (e.g., hop number, end-to-end latency, congestion degree, link bandwidth), a separate routing table may be maintained. The requirement specified in the abstract address (e.g., end-to-end latency) of a received packet is used to select the matching routing table.

Figure 9:
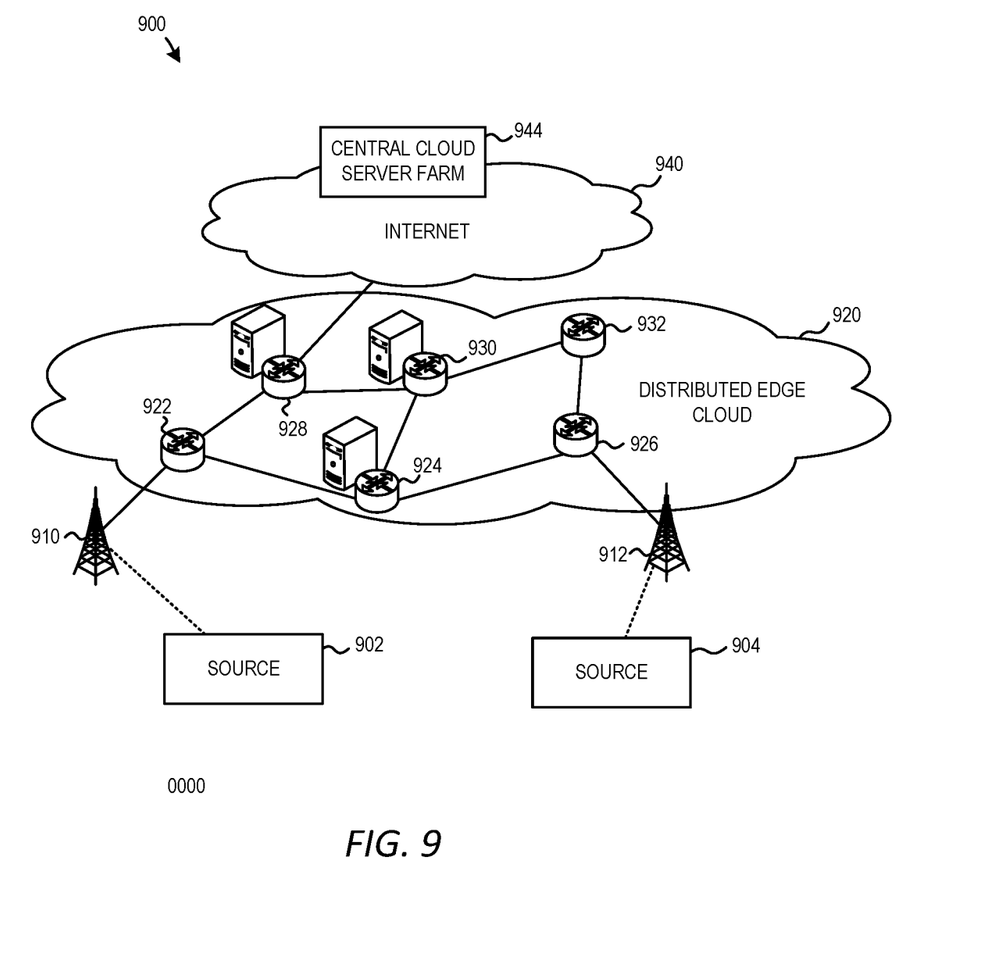
FIG. 9 is a schematic diagram illustrating a communication network in accordance with an embodiment of the present disclosure.

FIG. 9 is a schematic diagram illustrating a communication network 900 in accordance with an embodiment of the present disclosure. The communication network 900 is a three-tier architecture in which client-server interaction is distributed using edge computing. For instance, the communication network 900 includes a distributed edge cloud 920 that brings computation and data storage closer to source 902 and source 904 to improve response times and save bandwidth. In the depicted embodiment, the packets from the source 902 and source 904 can be routed to the distributed edge cloud 920 via base station 910 (e.g., an eNodeB) and base station 912. In some embodiments, the source 902 and source 904 could communicate with the distributed edge cloud 920 over non-wireless transmissions. The distributed edge cloud 920 includes a plurality of routers and a plurality of edge servers (i.e., servers within the distributed edge cloud 920). For example, the distributed edge cloud 920 includes, but are not limited to, router 922, router 926, router 932, edge server 924, edge server 928, and edge server 930. Each of the edge servers may have different capabilities or resources.

The edge servers 924, 928, 930 can communicate with a central cloud server farm 944 over the Internet 940. The central cloud server farm 944 is a plurality of servers usually maintained by an organization or provider to supply server functionality far beyond the capability of a single machine. For example, in an embodiment, the central cloud server farm 944 may provide remote driving assistance information to the source 902 and source 904. As stated above, the distributed edge cloud 920 brings computation and data storage closer to source 902 and source 904 to improve response times and save bandwidth. For example, instead of having to route packets from the source 902 all the way back to the central cloud server farm 944 for processing (e.g., data regarding object detection), in some instances, the packets could be processed by an edge server 924, 928, 930 in the distributed edge cloud 920. However, currently, the source 902, 904 would have to know the address of the edge server 924, 928, 930 capable of handling the request in generating the packet. The disclosed embodiments resolve or alleviate this is issue by utilizing an abstract destination address that describes the requested resources of the destination server as shown in FIG. 1, FIG. 2, and FIG. 3. A router (e.g., router 922) that receives the packet containing the abstract destination address describing the requested resources of the destination server can use a routing table or record such as resource record 400 in FIG. 4 or resource record 700 in FIG. 7 to forward the packet to destination that has sufficient resources to handle the request as described by process 500 in FIG. 5.

Figure 10:
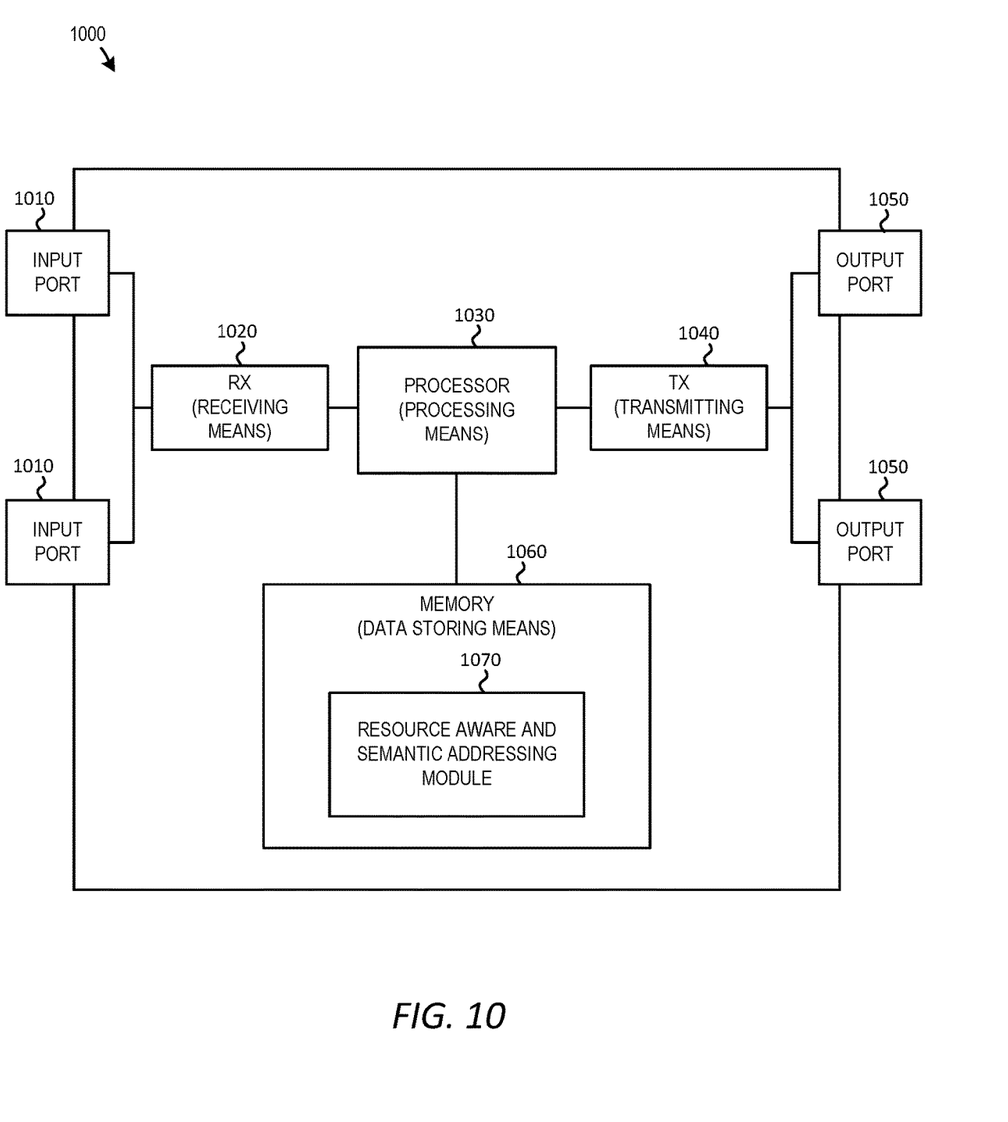
FIG. 10 is a schematic diagram illustrating a system in accordance with an embodiment of the present disclosure.

FIG. 10 is a schematic diagram illustrating a system 1000 in accordance with an embodiment of the present disclosure. The system 1000 may be used to implement various embodiments of a network node such as a router or a server/edge server as disclosed herein. For example, the system 1000 may be used to implement the router 922 in the distributed edge cloud 920 in FIG. 9.

The system 1000 includes a receiver unit (RX) 1020 or receiving means for receiving data via one or more input ports 1010. The system 1000 also includes a transmitter unit (TX) 1040 or transmitting means for transmitting or forwarding data out of one or more output ports 1050. In some embodiments, the RX 1020 and the TX 1040 may be combined into a single transceiver unit. Additionally, an input 1010 and output port 1050 may be combined into a bidirectional port.

The system 1000 includes a memory 1060 or data storing means for storing the instructions and various data. The memory 1060 can be any type of, or combination of, memory components capable of storing data and/or instructions. For example, the memory 1060 can include volatile and/or non-volatile memory such as read-only memory (ROM), random access memory (RAM), ternary content-addressable memory (TCAM), and/or static random-access memory (SRAM). The memory 1060 can also include one or more disks, tape drives, and solid-state drives. In some embodiments, the memory 1060 can be used as an over-flow data storage device or buffer to store programs when such programs are selected for execution, and to store instructions and data that are read during program execution.

The system 1000 has one or more processors 1030 or other processing means to process instructions. In some embodiments, the processor 1030 may be a central processing unit (CPU) chip having one or more processing cores, a field-programmable gate array (FPGA), an application specific integrated circuit (ASIC), and/or a digital signal processor (DSP). The processor 1030 is communicatively coupled via a system bus with the ingress ports 1010, RX 1020, TX 1040, egress ports 1050, and memory 1060. The processor 1030 can be configured to execute instructions stored in the memory 1060. Thus, the processor 1030 provides a means for performing any computational, comparison, determination, initiation, or configuration steps, or any other action, corresponding to the claims or disclosure when the appropriate instruction is executed by the processor. In some embodiments, the memory 1060 can be memory that is integrated with the processor 1030.

In one embodiment, the memory 1060 stores a resource aware and semantic addressing module 1070. The resource aware and semantic addressing module 1070 includes data and executable instructions for implementing the disclosed embodiments. For instance, the resource aware and semantic addressing module 1070 can include instructions for implementing the method described in FIG. 5. The inclusion of the resource aware and semantic addressing module 1070 provides a technical improvement to the functionality of the system 1000 by enabling the system 1000 to route packets to a destination based on an abstract destination address specifying the requested resource requirements of a destination server. Thus, a source does not need to know where to route a packet and routers within the network can forward the packet to a server that is able to satisfy the requested requirements of specified in the packet without having to first forward the packet to a central cloud server. Accordingly, the disclosed embodiments decrease network traffic congestion and increase efficiency in packet routing.

In some embodiments, the system 1000 may include additional modules for performing any one of, or combination of, steps described in the embodiments. A module may include a particular set of functions, software instructions, or circuitry that is configured to perform a specific task. Further, any of the additional or alternative embodiments or aspects of the method, as shown in any of the figures or recited in any of the claims, are also contemplated to include similar modules.

Certain embodiments may be implemented as a system, an apparatus, a method, and/or a computer program product. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

It should be noted that while the disclosure references various types of network devices such as routers, servers, edge servers, the disclosed embodiments are not limited to a specific type of network node and can, in some embodiments, be applied to any type of network device or node.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method performed by a network node for routing packets comprising:
receiving a packet that includes an abstract destination address in a shipping specification of the packet, the abstract destination address indicating one or more network resource requirements of a destination;
determining whether a server satisfies the one or more network resource requirements of the destination specified by the abstract destination address; and forwarding the packet to the server according to the determination.

2. The method of claim 1, further comprising setting a destination address of the server to a default destination address when there are no servers that satisfy the one or more network resource requirements of the destination specified in the abstract destination address, wherein the default destination address is specified in a third portion of the abstract destination address.

3. The method of claim 1, wherein the one or more network resource requirements of the destination specified in the abstract destination address comprise at least one of a computation capability of the destination or a specific algorithm availability at the destination.

4. The method of claim 1, wherein the abstract destination address comprises a first portion and a second portion, the first portion indicating the one or more network resource requirements of the destination, and the second portion indicating a physical criteria of the destination.

5. The method of claim 4, wherein determining whether the server satisfies the one or more network resource requirements of the destination specified by the abstract destination address comprises:
identifying one or more servers that satisfy the one or more network resource requirements of the destination specified in the first portion of the abstract destination address;
when there is only one identified server that satisfies the one or more network resource requirements of the destination specified in the first portion of the abstract destination address, selecting the one identified server that satisfies the one or more network resource requirements of the destination specified in the first portion of the abstract destination address as the server; and
when there are multiple identified servers that satisfy the one or more network resource requirements of the destination specified in the first portion of the abstract destination address, selecting the server from the multiple identified servers according to the physical criteria of the destination specified in the second portion of the abstract destination address.

6. The method of claim 4, wherein the physical criteria of the destination specified in the second portion of the abstract destination address comprise at least one of a distance away from the network node, a link bandwidth requirement, a degree of congestion requirement, or an end-to-end latency requirement.

7. The method of claim 5, further comprising:
maintaining a resource record of servers, wherein the resource record comprises a server address and resource properties for each server in the resource record of the servers, and
wherein the network node uses the resource record of the servers in identifying the one or more servers that satisfy the one or more network resource requirements of the destination specified in the abstract destination address.

8. The method of claim 7, wherein the resource record further comprises network topology context data for each server in the resource record of the servers.

9. The method of claim 7, further comprising receiving packets periodically broadcasted from each server in the resource record of the servers to indicate the resource properties of the each server, and modifying the resource record of the servers according to the resource properties of the each server.

10. The method of claim 9, wherein the packets are router advertisement packets.

11. The method of claim 2, further comprising:
maintaining a plurality of routing tables, wherein each routing table comprises a server address name, wherein the server address name is a semantic address indicating resource properties of the server, and
performing an intersection matching using the plurality of routing tables in identifying the servers that satisfy the one or more network resource requirements of the destination specified in the abstract destination address.

12. The method of claim 11, wherein the semantic address comprises a first semantic address portion, a second semantic address portion, and a third semantic address portion, the first semantic address portion indicating available resource types of the server, the second semantic address portion indicating supported application types of the server, and the third semantic address portion indicating a unique identifier associated with the server.

13. The method of claim 12, further comprising applying a first hash function to the first semantic address portion of the semantic address, and applying a second hash function to the second semantic address portion of the semantic address.

14. The method of claim 12, further comprising reducing a routing table by aggregating intersected server address names that have a common next hop forwarding interface.

15. A method for routing packets, the method comprising:
generating a packet comprising an abstract destination address in a shipping specification of the packet, the abstract destination address comprising a first portion and a second portion, the first portion indicating one or more network resource requirements of a destination, and the second portion indicating a physical criteria of the destination; and
transmitting the packet to a network node configured to forward the packet based at least in part on the one or more network resource requirements of the destination specified in the first portion of the abstract destination address.

16. The method of claim 15, wherein the abstract destination address further comprises a default destination address specified in a third portion of the abstract destination address.

17. The method of claim 15, wherein the one or more network resource requirements of the destination specified in the abstract destination address comprise at least one of a computation capability of the destination or a specific algorithm availability at the destination.

18. The method of claim 15, wherein the physical criteria of the destination specified in the second portion of the abstract destination address comprise at least one of a distance away from the network node, a link bandwidth requirement, a degree of congestion requirement, or an end-to-end latency requirement.

19. A network node, comprising:
a memory storing instructions; and
at least one processor in communication with the memory, the at least one processor configured, upon execution of the instructions, to perform the following steps:
receive a packet that includes an abstract destination address in a shipping specification of the packet, the abstract destination address indicates one or more network resource requirements of a destination;
determine whether a server satisfies the one or more network resource requirements of the destination specified by the abstract destination address; and forward the packet to the server according to the determination.

20. The network node of claim 19, wherein the at least one processor further executes the instructions to cause the network node to set a destination address of the server to a default destination address when there are no servers that satisfy the one or more network resource requirements of the destination specified in the abstract destination address, wherein the default destination address is specified in a third portion of the abstract destination address.

* * * * *